(12) United States Patent
Zhao et al.

(10) Patent No.: US 9,408,069 B2
(45) Date of Patent: Aug. 2, 2016

(54) SERVICE CONTROL METHOD, TERMINAL, AND NETWORK DEVICE

(71) Applicant: Huawei Device Co., Ltd., Shenzhen (CN)

(72) Inventors: Xiaofei Zhao, Shenzhen (CN); Hai Lian, Shanghai (CN); Shujun Dang, Beijing (CN); Guoqiong Cao, Beijing (CN); Shenyun Zhang, Shanghai (CN); Haihong Lin, Shenzhen (CN); Xiaoyun Jing, Shenzhen (CN)

(73) Assignee: Huawei Device Co., Ltd., Shenzhen, Guangdong ( * ) Notice: Subject to any disclaimer, the term of this patent is extended or adjusted under 35 U.S.C. 154(b) by 0 days.

(21) Appl. No.: 14/586,203

(22) Filed: Dec. 30, 2014

(65) Prior Publication Data

US 2015/0111563 A1    Apr. 23, 2015

Related U.S. Application Data

(63) Continuation of application No. PCT/CN2013/080814, filed on Aug. 5, 2013.

(30) Foreign Application Priority Data

Aug. 3, 2012 (CN) ............ 2012 1 0275320

(51) Int. Cl.
    *H04W 8/22* (2009.01)
    *H04W 24/08* (2009.01)
    *H04W 24/02* (2009.01)

(52) U.S. Cl.
    CPC ............. *H04W 8/22* (2013.01); *H04W 24/02* (2013.01); *H04W 24/08* (2013.01); *Y02B 60/50* (2013.01)

(58) Field of Classification Search
CPC . H04W 36/32; H04W 28/18; H04W 36/0083; H04W 36/0088; H04W 36/30; H04W 48/20; H04W 36/165; H04W 48/04; H04W 48/18; H04W 84/005; H04W 52/16; H04W 52/367; H04W 88/02; H04W 36/0072; H04W 36/08; H04W 36/10; H04W 36/14; H04W 36/22; H04W 36/24; H04W 52/146; H04W 52/246; H04W 92/12; H04W 92/22; H04L 47/805; H04L 47/822; H04L 67/2804; G01S 5/0027; H04B 17/309

See application file for complete search history.

(56) References Cited

U.S. PATENT DOCUMENTS

2007/0019587 A1   1/2007  Okamoto et al.
2010/0309798 A1  12/2010  Fodor et al.

(Continued)

FOREIGN PATENT DOCUMENTS

CN      101583178 A    11/2009
CN      102014103 A    4/2011

(Continued)

OTHER PUBLICATIONS

Partial English Translation and Abstract of Chinese Patent Application No. CN101583178A, Part 1, Apr. 17, 2015, 78 pages.

(Continued)

*Primary Examiner* — Nizar Sivji (74) *Attorney, Agent, or Firm* — Conley Rose, P.C.; Grant Rodolph (57) ABSTRACT

A service control method, a terminal, and a network device. The method includes measuring, by a terminal, a service status of interaction between the terminal and a network and/or a moving speed of the terminal; and reporting, by the terminal, measured service status information and/or speed information to a network device, so that the network device configures a network parameter of the terminal according to the service status information and/or the speed information. Therefore, a network throughput is improved, and terminal energy consumption is reduced.

10 Claims, 6 Drawing Sheets

(56) References Cited

U.S. PATENT DOCUMENTS

| | | | |
|---|---|---|---|
| 2011/0053630 A1 | 3/2011 | Higuchi | |
| 2011/0086635 A1 | 4/2011 | Grob-Lipski | |
| 2011/0287767 A1* | 11/2011 | Huang | H04L 43/00 455/436 |

FOREIGN PATENT DOCUMENTS

| | | | |
|---|---|---|---|
| CN | 102137383 A | 7/2011 | |
| CN | 102137430 A | 7/2011 | |
| CN | 102572989 A | 7/2012 | |
| CN | 102802188 A | 11/2012 | |
| EP | 1628498 A2 | 2/2006 | |
| EP | 2157830 A1 | 2/2010 | |
| EP | 2395704 A1 | 12/2011 | |
| EP | 2426980 A1 | 3/2012 | |
| EP | 2515562 A1 | 10/2012 | |
| JP | 2010050969 A | 3/2010 | |
| JP | 2010530648 A | 9/2010 | |
| JP | 2010538506 A | 12/2010 | |
| JP | 2013524563 A | 6/2013 | |
| JP | 2014502125 A | 1/2014 | |
| WO | 2008156180 A1 | 12/2008 | |
| WO | 2009119051 A1 | 10/2009 | |
| WO | 2011116849 A1 | 9/2011 | |
| WO | 2012096403 A1 | 7/2012 | |

OTHER PUBLICATIONS

Partial English Translation and Abstract of Chinese Patent Application No. CN101583178A, Part 2, Apr. 22, 2015, 5 pages.
Partial English Translation and Abstract of Chinese Patent Application No. CN102014103A, Apr. 17, 2015, 9 pages.
Foreign Communication From a Counterpart Application, Chinese Application No. 201210275320.9, Chinese Office Action dated Mar. 9, 2015, 8 pages.
Partial English Translation and Abstract of Chinese Patent Application No. CN102802188A, Part 1, Jan. 5, 2015, 8 pages.
Partial English Translation and Abstract of Chinese Patent Application No. CN102802188A, Part 2, Jan. 5, 2015, 4 pages.
Foreign Communication From a Counterpart Application, PCT Application No. PCT/CN2013/080814, English Translation of International Search Report dated Nov. 21, 2013, 2 pages.
Foreign Communication From a Counterpart Application, PCT Application No. PCT/CN2013/080814, English Translation of Written Opinion dated Nov. 21, 2013, 12 pages.
Foreign Communication From a Counterpart Application, Chinese Application No. 201210275320.9, Chinese Office Action dated Jun. 9, 2014, 9 pages.
"Measurement report on UE mobility state," 3GPP TSG-RAN WG2#61, R2-080819, Feb. 11-15, 2008, 1 page.
"UE mobility state reporting," 3GPP TSG-RAN WG2#61 bis, R2-081760, Mar. 31-Apr. 4, 2008, 1 page.
"Measurement for coverage optimization," 3GPP TSG-RAN WG2 Meeting #69bis, R2-102080, Apr. 12-16, 2010, 10 pages.
Foreign Communication From a Counterpart Application, European Application No. 13826028.6, Extended European Search Report dated Jun. 17, 2015, 12 pages.
Partial English Translation and Abstract of Japanese Patent Application No. JPA201050969, Mar. 16, 2016, 61 pages.
Partial English Translation and Abstract of Japanese Patent Application No. JPA2010530648, Mar. 16, 2016, 5 pages.
Partial English Translation and Abstract of Japanese Patent Application No. JPA2010538506, Mar. 16, 2016, 33 pages.
Partial English Translation and Abstract of Japanese Patent Application No. JPA2013524563, Mar. 16, 2016, 134 pages.
Partial English Translation and Abstract of Japanese Patent Application No. JPA2014502125, Mar. 16, 2016, 140 pages.
"Discussion on UE assistant information," 3GPP TSG-RAN WG2 Meeting #78, R2-122437, May 21-25, 2012, 4 pages.
Foreign Communication From a Counterpart Application, Application No. 2015-524627, English Translation of Japanese Office Action dated Feb. 9, 2016, 7 pages.
Foreign Communication From a Counterpart Application, Korean Application No. 10-2014-7037179, Korean Office Action dated Jan. 7, 2016, 6 pages.
Foreign Communication From a Counterpart Application, Korean Application No. 10-2014-7037179, English Translation of Korean Office Action dated Jan. 7, 2016, 4 pages.

* cited by examiner

SERVICE CONTROL METHOD, TERMINAL, AND NETWORK DEVICE

CROSS-REFERENCE TO RELATED APPLICATIONS

This application is a continuation of International Application No. PCT/CN2013/080814, filed on Aug. 5, 2013, which claims priority to Chinese Patent Application No. 201210275320.9, filed on Aug. 3, 2012, both of which are hereby incorporated by reference in their entireties.

TECHNICAL FIELD

The present invention relates to the field of communications technologies, and in particular, to a service control method, a terminal, and a network device.

BACKGROUND

With the wide application of smart multimedia mobile phones, terminal users use all types of communication and multimedia functions provided by the mobile phones more and more frequently.

In the prior art, a terminal usually sends parameters of a radio frequency module, such as a parameter of signal strength, to a network, so that the network performs cell handover or transmission scheduling of the terminal according to the parameters. However, a network throughput is low and terminal energy consumption is large in the prior art.

SUMMARY

Embodiments of the present invention provide a service control method, a terminal, and a network device, so as to improve a network throughput and reduce terminal energy consumption.

According to one aspect, an embodiment of the present invention provides a service control method, including measuring, by a terminal, a service status and/or a speed; reporting, by the terminal, measured service status information of interaction between the terminal and a network and/or moving speed information of the terminal to a network device, so that the network device configures a network parameter of the terminal according to the service status information and/or the speed information.

An embodiment of the present invention further provides a service control method, including receiving, by a network device, service status information of interaction between a terminal and a network and/or moving speed information of the terminal reported by the terminal; and configuring, by the network device, a network parameter of the terminal according to the service status information and/or the speed information.

According to another aspect, an embodiment of the present invention further provides a terminal, which includes an interface module, and further includes at least one of a measuring module and a service module, where the service module is configured to measure a service status of interaction between the terminal and a network; the measuring module is configured to measure a moving speed of the terminal; and the interface module is configured to report measured service status information and/or speed information to a network device, so that the network device configures a network parameter of the terminal according to the service status information and/or the speed information.

An embodiment of the present invention further provides a network device, including an interface module configured to receive service status information of interaction between a terminal and a network and/or moving speed information of the terminal reported by the terminal; and a configuring module configured to configure a network parameter of the terminal according to the service status information and/or the speed information.

In the service control method, terminal, and network device provided in the embodiments of the present invention, the terminal can report its service status information and/or speed information to the network device, and the network device can configure a network parameter of the terminal according to the information, thereby improving a network throughput and reducing terminal energy consumption.

BRIEF DESCRIPTION OF DRAWINGS

To describe the technical solutions in the embodiments of the present invention more clearly, the following briefly introduces accompanying drawings required for describing the embodiments or the prior art. The accompanying drawings in the following description show some embodiments of the present invention, and a person of ordinary skill in the art may still derive other drawings according to these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The embodiments to be described are a part rather than all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current second generation (2G) and third generation (3G) communications systems and a next-generation communications system, such as a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other communications systems of these types.

A terminal in this application, that is, a user equipment (UE), may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, a user device, or a UE.

A network device in this application may be a device independently deployed on a radio access network (RAN), for example, a base station, or a radio network controller (RNC), or may also be a functional module in the foregoing devices on the radio access network.

The network device may be a base station, for example, an access point. The base station may refer to a device in communication with a wireless terminal through one or more sectors at an air interface in an access network. The base station may be configured to mutually convert a received over-the-air frame and an internet protocol (IP) packet and serve as a router between the wireless terminal and a rest portion of the access network, where the rest portion of the access network may include an IP network. The base station may also coordinate attribute management of the air interface. For example, the base station may be a base station (BTS) in GSM or CDMA, may also be a base station (NodeB) in WCDMA, and may further be an evolved NodeB (NodeB, eNB, or e-NodeB) in the LTE, which is not limited in this application.

In addition, the terms "system" and "network" may often be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

Figure 1:
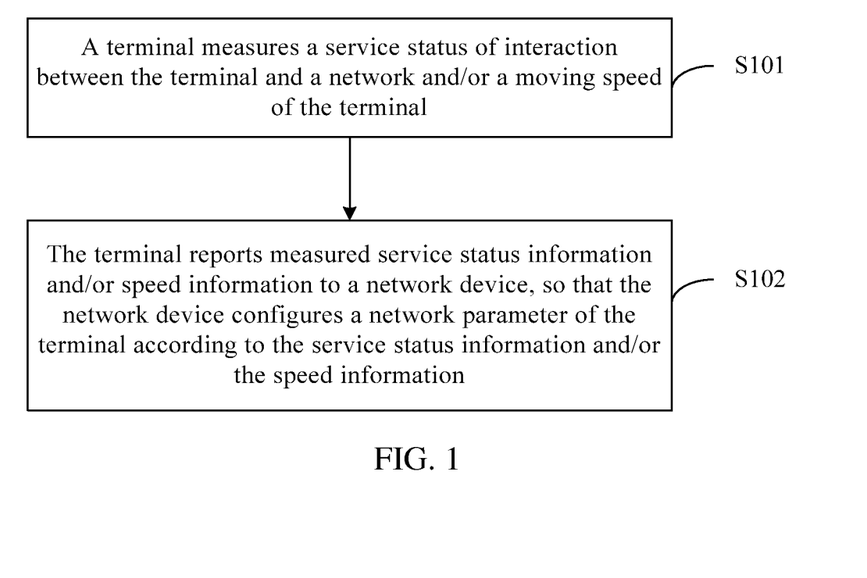
FIG. 1 is a flowchart of a service control method according to an embodiment of the present invention.

FIG. 1 is a flowchart of a service control method according to an embodiment of the present invention. As shown in FIG. 1, the method includes the following steps.

S101: A terminal measures a service status of interaction between the terminal and a network and/or a moving speed of the terminal.

S102: The terminal reports measured service status information and/or speed information to a network device, so that the network device configures a network parameter of the terminal according to the service status information and/or the speed information.

As a possible implementation manner, the terminal may actively measure the service status of interaction between the terminal and the network and/or the moving speed of the terminal, and actively report its service status information and/or speed information to the network device.

As another possible implementation manner, the terminal may also measure the service status and/or the speed as requested by the network device, and report the measured service status information and/or speed information to the network device.

For example, the terminal may receive a report request sent by the network device, where the report request may be used to instruct the terminal to report the service status information and/or the speed information. Optionally, the terminal may send a report response to the network device, where the report response is used to represent that the terminal receives the report request and/or whether a report operation instructed by the report request is executed.

The terminal may measure its service status and/or speed after receiving the report request sent by the network device. Optionally, the service status information of the terminal may include one or any combination of the following information: start information of at least one service of the terminal, stop information of at least one service of the terminal, and data volume information of at least one service of the terminal. The terminal may measure service statuses of all types of services using a service module. Optionally, the speed information of the terminal may be measured using a speed measuring module of the terminal, such as a global positioning system (GPS), a gravity sensor, a gyroscope, an acceleration sensor, a proximity sensor, and a camera. It is understandable that, different types of terminals have different modules for measuring the speed, and so modules having a speed measuring function in terminals will not be listed one by one herein.

Optionally, the terminal may report the measured service status information and/or speed information to the network device periodically.

Optionally, the terminal may further report the measured service status information and/or speed information to the network device in an event triggering manner. That is, if a trigger condition is met, the terminal may report the measured service status information and/or speed information to the network device. The trigger condition may include one or any combination of the following: at least one service of the terminal is started, at least one service of the terminal is closed, and a rate of the terminal exceeds a set threshold. It is understandable that, the terminal may set the trigger condition according to actual requirements.

Optionally, a cycle or a trigger condition for reporting the service status information and/or the speed information by the terminal may also be determined by the network device, and the network device carries information of the cycle or the trigger condition in the report request.

After the terminal reports the service status information and/or the speed information to the network device, the network device configures a connected discontinuous reception (CDRX) parameter of the terminal according to the service status information of the terminal, or according to the service status information and the speed information. The network device may further configure, according to the speed information of the terminal, a network parameter of the terminal, such as a CDRX parameter, a sounding parameter, a channel quality indicator (CQI) parameter, and a frequency selective channel, to improve a network throughput and reduce terminal energy consumption. The CDRX parameter may be a CDRX dormancy cycle.

Optionally, the terminal may further receive a stop report request sent by the network device, where the stop report request is used to instruct the terminal to stop reporting the service status information and/or the speed information. After receiving the stop report request, the terminal may stop measuring the service status and/or the speed, so as to stop reporting the service status information and/or the speed information to the network device.

According to the service control method, terminal, and network device provided in the embodiment, the terminal can report its service status information and/or speed information to the network device, and the network device can configure a network parameter of the terminal according to the information, thereby improving a network throughput and reducing terminal energy consumption.

Figure 2:
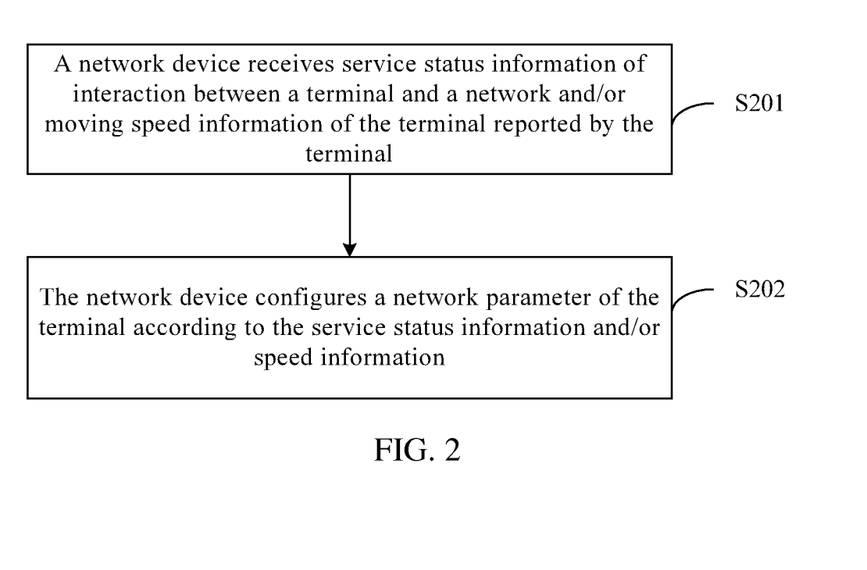
FIG. 2 is a flowchart of a service control method according to another embodiment of the present invention.

FIG. 2 is a flowchart of a service control method according to another embodiment of the present invention. As shown in FIG. 2, the method includes the following steps.

S201: A network device receives service status information of interaction between a terminal and a network and/or moving speed information of the terminal reported by the terminal.

S202: The network device configures a network parameter of the terminal according to the service status information and/or the speed information.

As a possible implementation manner, the network device may send a report request to the terminal, where the report request is used to instruct the terminal to report the service status information and/or the speed information, so as to trigger the terminal to measure and report the service status information and/or the speed information.

Optionally, after sending the report request to the terminal, the network device may receive a report response sent by the terminal, where the report response is used to represent that the terminal receives the report request and/or whether a report operation instructed by the report request is executed.

Optionally, the network device may determine for the terminal a cycle or a trigger condition for reporting the service status information and/or the speed information, and carry the cycle or the trigger condition in the report request, so as to trigger the terminal to report the service status information and/or the speed information.

After receiving the service status information and/or the speed information reported by the terminal, the network device may configure a network parameter of the terminal. Optionally, if the network device receives the service status information, or the service status information and the speed information reported by the terminal, the network parameter may be a CDRX parameter; and if the network device receives the speed information reported by the terminal, the network parameter may include one or any combination of the following: a CDRX parameter, a sounding parameter, a CQI parameter, and a frequency selective channel.

As a possible implementation manner, the network device may dynamically configure the CDRX parameter of the terminal according to the speed information reported by the terminal, to save terminal energy consumption. The network may further configure a reasonable frequency selective channel and CQI parameter for the terminal according to the speed information reported by the terminal, to ensure performance of a frequency selective algorithm.

As another possible implementation manner, the network device may further determine a speed of the terminal according to the speed information, increase a sounding cycle of the terminal in a still state, and decrease a sounding cycle of the terminal with a speed exceeding a first set threshold. Therefore, a long sounding cycle is configured for the quiescent terminal, so as to support more beam forming (BF) users with a same baseband processing resource, or improve a sounding bandwidth and improve BF performance. Further, for the terminal with the speed exceeding a certain threshold (the first set threshold), there is no BF gain for these users, and a long sounding cycle and a small sounding bandwidth are allocated, so as to save sounding resource consumption.

As yet another possible implementation manner, the network device may further determine a speed of the terminal according to the speed information, increase a CDRX parameter of the terminal with a speed lower than a second set threshold or of the quiescent terminal, and decrease a CDRX parameter of the terminal with a speed higher than the second set threshold or set the CDRX parameter to 0. That is, a long CDRX parameter may be configured for a low-speed or quiescent terminal; and a short CDRX parameter may be configured for a high-speed terminal, and even the terminal may be controlled to exit a CDRX status.

As yet another possible implementation manner, the network device may further determine a speed of the terminal according to the speed information, and configure the frequency selective channel for the terminal with a speed higher than a third set threshold. That is, a frequency selective algorithm may be started for a low-speed terminal, to configure a frequency selective channel for the terminal; and a common scheduling algorithm may be adopted for a high-speed terminal.

The foregoing first set threshold, second set threshold, and third set threshold may be set according to specific requirements, and the foregoing thresholds may be same or different.

As another possible implementation manner, in a scenario that the network device configures the network parameter of the terminal according to the service status information and the speed information reported by the terminal, if a CDRX parameter of the terminal determined by the network device according to the speed information is a first parameter, and a CDRX parameter of the terminal determined according to the service status information is a second parameter, the network device may configure the network parameter of the terminal to a smaller value between the first parameter and the second parameter.

As another possible implementation manner, the network device may configure different CDRX parameters according to different service status information reported by the terminal. For example, a 160 milliseconds (ms) CDRX cycle may be configured for an instant messenger (IM) service, and a 320 ms CDRX cycle may be configured for an email, such as a Gmail service, so as to save terminal energy consumption.

Optionally, the network device may further send a stop report request to the terminal according to actual requirements for adjusting the network parameter of the terminal, and instruct, using the stop report request, the terminal to stop reporting the service status information and/or the speed information.

According to the service control method provided in the embodiment, a terminal can report its service status information and/or speed information to a network device, and the network device can configure a network parameter of the terminal according to the information, and can configure the network parameter of the terminal such as a CDRX parameter of the terminal, a sounding parameter, a CQI parameter, and a frequency selective channel, thereby improving a network throughput and reducing terminal energy consumption.

Figure 3:
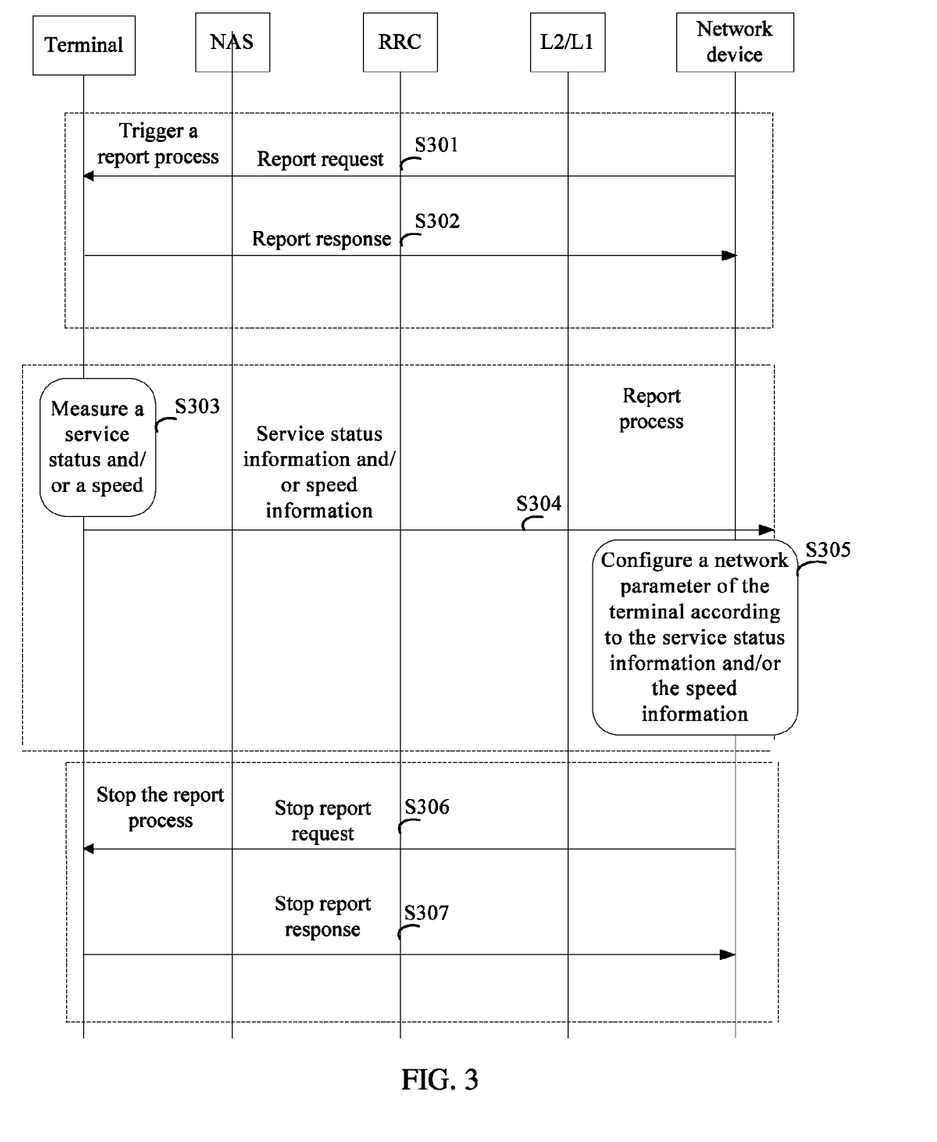
FIG. 3 is a flowchart of a service control method according to yet another embodiment of the present invention.

FIG. 3 is a flowchart of a service control method according to yet another embodiment of the present invention. As shown in FIG. 3, this embodiment provides an implementation scenario where a terminal and a network device interact to implement the service control method, and the method includes the following steps.

S301: The network device sends a report request to the terminal, where the report request is used to instruct the terminal to report service status information and/or speed information.

In the implementation scenario of this embodiment, the terminal is a UE, and the network device is an eNB, the UE is successfully registered, and a default bearer between the UE and a packet data network gateway (PGW) is established successfully.

In an implementation scenario, a data channel between the UE and the eNB is established, the report request sent by the eNB to the UE may be a network access server (NAS) message (a heartbeat service-type query and open request (UE apptype request) message), where the NAS message may be a newly-defined message for requesting the terminal to report the service status information. After receiving the NAS message, a radio resource control protocol (RRC) layer sends the NAS message to an NAS layer, and then sends the NAS message to an application layer (APP) through the NAS layer.

In another implementation scenario, the report request sent by the eNB to the UE may further be a terminal rate report request (UE Rate Report Request), for requesting the terminal to report the speed information. Similarly, after receiving the NAS message, the RRC layer sends the NAS message to the NAS layer, and then sends the NAS message to the APP layer through the NAS layer.

S302: The terminal sends a report response to the network device, where the report response is used to represent that the terminal receives the report request and/or whether a report operation instructed by the report request is executed.

In a scenario that the terminal receives the UE apptype request message, the terminal may send a service type query and open response (UE apptype Response) message to the network device, to represent that the terminal successfully receives the UE apptype request and starts to configure measurement of the service status of the terminal and performs the measurement according to the configuration.

Similarly, in a scenario that the terminal receives the UE Rate Report Request message, the terminal may send a terminal rate report response (UE Rate Report Response) message to the network device.

S303: The terminal measures a service status of interaction between the terminal and a network and/or a moving speed of the terminal.

S304: The terminal reports the service status information and/or the speed information to the network device.

After the terminal receives the service status information and/or the speed information of the terminal, a private NAS message format may be formed in the NAS layer using the service status information and/or the speed information, and may be reported to the network device using a UE apptype report NAS message.

S305: The network device configures a network parameter of the terminal according to the service status information and/or the speed information.

S306: The network device sends a stop report request to the terminal, where the stop report request is used to instruct the terminal to stop reporting the service status information and/or the speed information.

S307: The terminal sends a report stop response to the network device, where the report stop response is used to represent that the terminal receives the stop report request.

For a process that the network device configures the network parameter of the terminal according to the service status information and/or the speed information, reference may be made to the relevant descriptions of the embodiment shown in FIG. 2 and details are not described herein again.

According to the service control method provided in the embodiment, a terminal can report its service status information and/or speed information to a network device, and the network device can configure a network parameter of the terminal according to the information, and can configure the network parameter of the terminal such as a CDRX parameter of the terminal, a sounding parameter, a CQI parameter, and a frequency selective channel, thereby improving a network throughput and reducing terminal energy consumption.

Figure 4:
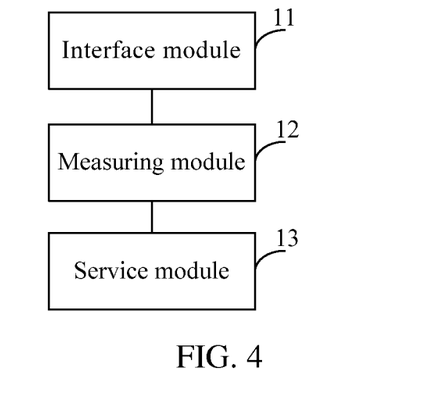
FIG. 4 is a schematic structural diagram of a terminal according to an embodiment of the present invention.

FIG. 4 is a schematic structural diagram of a terminal according to an embodiment of the present invention. As shown in FIG. 4, the terminal includes an interface module 11, and further includes at least one of a measuring module 12 and a service module 13, where the service module 13 is configured to measure a service status of interaction between the terminal and a network; the measuring module 12 is configured to measure a moving speed of the terminal; and the interface module 11 is configured to report measured service status information and/or speed information to a network device, so that the network device configures a network parameter of the terminal according to the service status information and/or the speed information.

Optionally, the measuring module 12 may include one or any combination of the following modules: a GPS module, a gravity sensor, a gyroscope, an acceleration sensor, a proximity sensor, and a camera.

Optionally, service status information measured by the service module 12 may include one or any combination of the following information: start information of at least one service of the terminal, stop information of at least one service of the terminal, and data volume information of at least one service of the terminal.

Optionally, the interface module 11 may be configured to report the measured service status information and/or speed information to the network device periodically; or report measured service status information and/or speed information to a network device if a trigger condition is met.

Optionally, the trigger condition may include one or any combination of the following: at least one service of the terminal is started, at least one service of the terminal is closed, and the rate of the terminal exceeds a set threshold.

Optionally, the interface module 11 may further be configured to receive a report request sent by the network device, where the report request is used to instruct the terminal to report the service status information and/or the speed information.

Optionally, the interface module 11 may further be configured to send a report response to the network device, where the report response is used to represent that the terminal receives the report request and/or whether a report operation instructed by the report request is executed.

Optionally, the interface module 11 may further be configured to receive a stop report request sent by the network device, where the stop report request is used to instruct the terminal to stop reporting the service status information and/or the speed information.

Correspondingly, the service module 13 may further be configured to stop measuring the service status of the terminal; and the measuring module 12 may further be configured to stop measuring the speed of the terminal.

Figure 5:
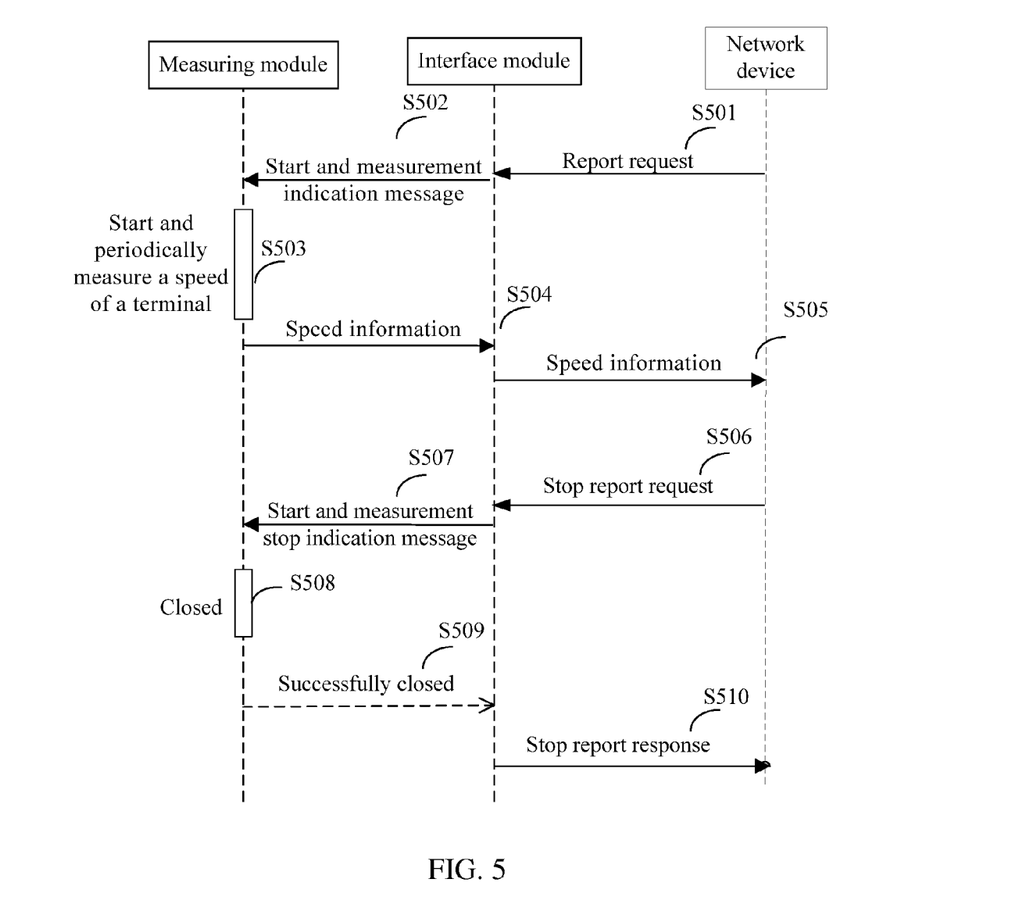
FIG. 5 is a flowchart of interaction between modules of a terminal according to an embodiment.

FIG. 5 is a flowchart of interaction between modules of a terminal according to an embodiment. As shown in FIG. 5, this embodiment provides a process that an interface module controls a measuring module to perform measurement, which includes the following steps.

S501: The interface module receives a report request sent by a network device.

The interface module may be a resident Dump module in the terminal with an initial status of idle status. In the idle status, the interface module may receive the report request delivered by the network device, such as an eNB, where the report request may be a private NAS message. After processing the NAS message, the interface module may return to the idle status.

S502: The interface module delivers a start and measurement indication message to the measuring module.

S503: The measuring module is started and periodically measures a moving speed of the terminal.

The measuring module may enter a measurement state, and resolves a private NAS signaling start and measurement indication message. The start and measurement indication message may include a cycle length of periodic measurement.

S504: The measuring module reports speed information of the terminal to the interface module periodically.

S505: The interface module reports the speed information of the terminal to the network device periodically or when a trigger condition is met.

After receiving the speed information of the terminal reported by the measuring module, the interface module may enter a report processing state, and may report the speed information of the terminal to the network device using the private NAS message periodically or when the trigger condition is met.

S506: The interface module receives a stop report request sent by the network device.

S507: The interface module delivers a start and measurement stop indication message to the measuring module.

S508: The measuring module is closed.

S509: The measuring module reports to the interface module that the measuring module is successfully closed.

S510: The interface module reports a report stop response to the network device.

Figure 6:
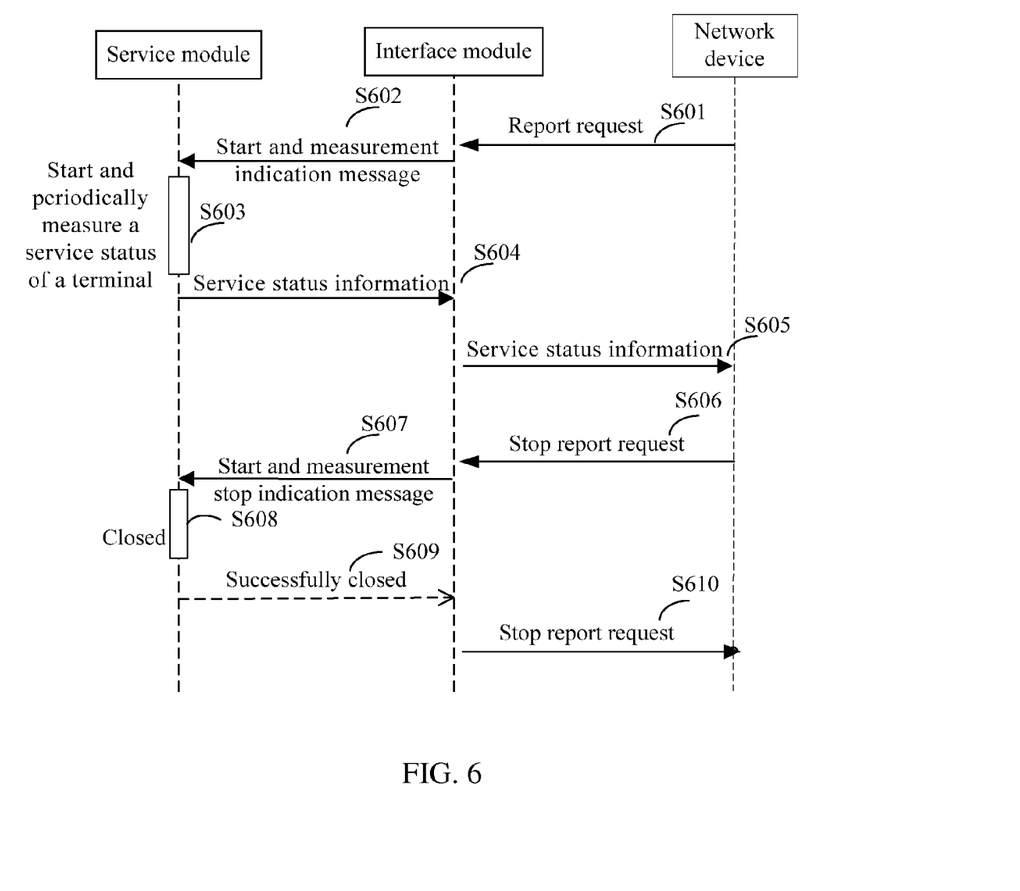
FIG. 6 is a flowchart of interaction between modules of a terminal according to another embodiment.

FIG. 6 is a flowchart of interaction between modules of a terminal according to another embodiment. As shown in FIG. 6, this embodiment provides a process that an interface module controls a service module to perform measurement, which includes the following steps.

S601: The interface module receives a report request sent by a network device.

S602: The interface module delivers a start and measurement indication message to the service module.

S603: The service module is started and periodically measures a service status of interaction between the terminal and a network.

S604: The service module reports service status information of the terminal to the interface module periodically.

S605: The interface module reports the service status information of the terminal to the network device periodically or when a trigger condition is met.

S606: The interface module receives a stop report request sent by the network device.

S607: The interface module delivers a start and measurement stop indication message to the service module.

S608: The service module stops measuring the service status information of the terminal.

S609: The service module reports to the interface module that the measuring module is successfully closed.

S610: The interface module reports a report stop response to the network device.

A process of S601 to S610 are similar to that of S501 to S510, reference may be made to relevant descriptions of S501 to S510, and details are not described herein again.

The terminal provided in the embodiment corresponds to the service control method provided in the embodiment of the present invention, and is a device for executing the service control method. For a specific process that the terminal executes the service control method, reference may be made to the method embodiments shown in FIG. 1 and FIG. 3, and details are not described herein again.

The terminal provided in the embodiment can report its service status information and/or speed information to a network device, and the network device can configure a network parameter of the terminal according to the information, thereby improving a network throughput and reducing terminal energy consumption.

Figure 7:
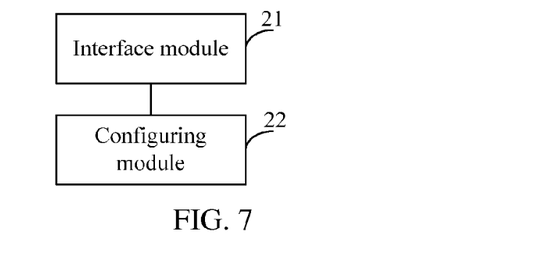
FIG. 7 is a schematic structural diagram of a network device according to an embodiment of the present invention.

FIG. 7 is a schematic structural diagram of a network device according to an embodiment of the present invention. As shown in FIG. 7, the network device includes an interface module 21 and a configuring module 22, where the interface module 21 is configured to receive service status information of interaction between a terminal and a network and/or moving speed information of the terminal reported by the terminal; and the configuring module 22 is configured to configure a network parameter of the terminal according to the service status information and/or the speed information.

Optionally, if the interface module 21 receives the service status information, or the service status information and the speed information reported by the terminal, the network parameter is a CDRX parameter; and if the interface module 21 receives the speed information reported by the terminal, the network parameter may include one or any combination of the following: a CDRX parameter, a sounding parameter, a CQI parameter, and a frequency selective channel.

Optionally, the configuring module 22 may be configured to determine a speed of the terminal according to the speed information, increase a sounding cycle of the terminal in a still state, and decrease a sounding cycle of the terminal with a speed exceeding a first set threshold; or determine a speed of the terminal according to the speed information, increase a CDRX parameter of the terminal with a speed lower than a second set threshold or of the quiescent terminal, and decrease a CDRX parameter of the terminal with a speed higher than the second set threshold or set the CDRX parameter to 0; or determine a speed of the terminal according to the speed information, and configure the frequency selective channel for the terminal with a speed higher than a third set threshold.

Optionally, the configuring module 22 may be configured to configure the CDRX parameter of the terminal according to the service status information of the terminal.

Optionally, the configuring module 22 may be configured to, if a CDRX parameter of the terminal determined according to the speed information is a first parameter, and a CDRX parameter of the terminal determined according to the service status information is a second parameter, configure the network parameter of the terminal to a smaller value between the first parameter and the second parameter.

Optionally, the interface module 21 may further be configured to send a report request to the terminal, where the report request is used to instruct the terminal to report the service status information and/or the speed information.

Optionally, the interface module 21 may further be configured to receive a report response sent by the terminal, where the report response is used to represent that the terminal receives the report request and/or whether a report operation instructed by the report request is executed.

Optionally, the interface module 21 may further be configured to send a stop report request to the terminal, where the stop report request is used to instruct the terminal to stop reporting the service status information and/or the speed information.

The network device provided in the embodiment corresponds to the service control method provided in the embodiment of the present invention, and is a device for executing the service control method. Reference may be made to the method embodiments shown in FIG. 2 and FIG. 3 for a specific process that the network device executes the service control method, and details are not described herein again.

According to the network device provided in the embodiment, a terminal can report its service status information and/or speed information to the network device, and the network device can configure a network parameter of the terminal according to the information, and can configure the network parameter of the terminal such as a CDRX parameter of the terminal, a sounding parameter, a CQI parameter, and a frequency selective channel, thereby improving a network throughput and reducing terminal energy consumption.

Figure 8:
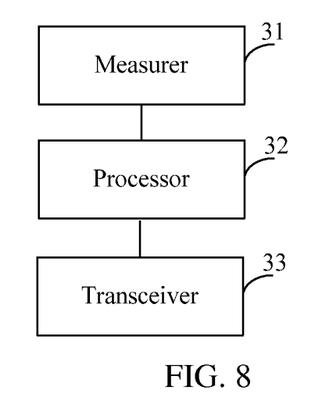
FIG. 8 is a schematic structural diagram of a terminal according to another embodiment of the present invention.

FIG. 8 is a schematic structural diagram of a terminal according to another embodiment of the present invention. As shown in FIG. 8, the terminal may be used to implement the service control methods provided in FIG. 1 and FIG. 3. The terminal may include a measurer 31, a processor 32, and a transceiver 33, where the measurer 31 is configured to measure a service status of interaction between the terminal and a network and/or moving speed of the terminal under the control of the processor 32, and send measured service status information and/or speed information to the processor 32; the processor 32 is configured to control the measurer 31 to measure the service status and/or the speed, and control the transceiver 33 to report the service status information and/or the speed information measured by the measurer 31 to a network device; and the transceiver 33 is configured to report the service status information and/or the speed information to the network device under the control of the processor 32, so that the network device configures a network parameter of the terminal according to the service status information and/or the speed information.

Optionally, the measurer 31 may include one or any combination of the following modules: a GPS module, a gravity sensor, a gyroscope, an acceleration sensor, a proximity sensor, and a camera.

Optionally, the service status information may include one or any combination of the following information: start information of at least one service of the terminal, stop information of at least one service of the terminal, and data volume information of at least one service of the terminal.

Optionally, the processor 32 may be configured to control the transceiver 33 to report the measured service status information and/or speed information to the network device periodically; or control the transceiver 33 to report the measured service status information and/or speed information to the network device if a trigger condition is met.

Optionally, the trigger condition may include one or any combination of the following: at least one service of the terminal is started, at least one service of the terminal is closed, and the rate of the terminal exceeds a set threshold.

Optionally, the transceiver 33 may further be configured to receive a report request sent by the network device, and send the report request to the processor 32, where the report request is used to instruct the terminal to report the service status information and/or the speed information.

Correspondingly, the processor 32 may further be configured to control the measurer 31 to measure the service status and/or the speed according to the report request; and may further be configured to control the transceiver 33 to send a report response to the network device, where the report response is used to represent that the terminal receives the report request and/or whether a report operation instructed by the report request is executed.

The transceiver 33 may further be configured to send a report response to the network device under the control of the processor 32.

Optionally, the transceiver 33 may further be configured to receive a stop report request sent by the network device, and send the stop report request to the processor 32, where the stop report request is used to instruct the terminal to stop reporting the service status information and/or the speed information.

Correspondingly, the processor 32 may further be configured to control, according to the stop report request, the measurer 31 to stop measuring the service status of the terminal; and the measurer 31 may further be configured to stop, under the control of the processor 32, measuring the status information and/or the speed of the terminal.

The terminal provided in the embodiment corresponds to the service control method provided in the embodiment of the present invention, and is a device for executing the service control method. Reference may be made to the method embodiments shown in FIG. 1 and FIG. 3 for a specific process that the terminal executes the service control method, and details are not described herein again.

The terminal provided in the embodiment can report its service status information and/or speed information to a network device, and the network device can configure a network parameter of the terminal according to the information, thereby improving a network throughput and reducing terminal energy consumption.

Figure 9:
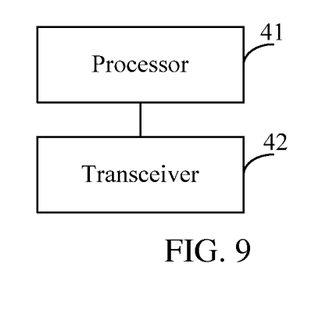
FIG. 9 is a schematic structural diagram of a network device according to another embodiment of the present invention.

FIG. 9 is a schematic structural diagram of a network device according to another embodiment of the present invention. As shown in FIG. 9, the network device includes a transceiver 42 and a processor 41, where the transceiver 42 is configured to receive service status information of interaction between a terminal and a network and/or moving speed information of the terminal reported by the terminal; and the processor 41 is configured to configure a network parameter of the terminal according to service status information and/or speed information.

Optionally, if the transceiver 42 receives the service status information, or the service status information and the speed information reported by the terminal, the network parameter may be a CDRX parameter; and if the transceiver 42 receives the speed information reported by the terminal, the network parameter may include one or any combination of the following: a CDRX parameter, a sounding parameter, a CQI parameter, and a frequency selective channel.

Optionally, the processor 41 may be configured to determine a speed of the terminal according to the speed information, increase a sounding cycle of the terminal in a still state, and decrease a sounding cycle of the terminal with a speed exceeding a first set threshold; or determine a speed of the terminal according to the speed information, increase a CDRX parameter of the terminal with a speed lower than a second set threshold or of the quiescent terminal, and decrease a CDRX parameter of the terminal with a speed higher than the second set threshold or set the CDRX parameter to 0; or determine a speed of the terminal according to the speed information, and configure the frequency selective channel for the terminal with a speed higher than a third set threshold.

Optionally, the processor 41 may be configured to configure the CDRX parameter of the terminal according to the service status information of the terminal.

Optionally, the processor 41 may be configured to, if a CDRX parameter of the terminal determined according to the speed information is a first parameter, and a CDRX parameter of the terminal determined according to the service status information is a second parameter, configure the network parameter of the terminal to a smaller value between the first parameter and the second parameter.

Optionally, the transceiver 42 may further be configured to send a report request to the terminal, where the report request is used to instruct the terminal to report the service status information and/or the speed information.

Optionally, the transceiver 42 may further be configured to receive a report response sent by the terminal, where the report response is used to represent that the terminal receives the report request and/or whether a report operation instructed by the report request is executed.

Optionally, the transceiver 42 may further be configured to send a stop report request to the terminal, where the stop report request is used to instruct the terminal to stop reporting the service status information and/or the speed information.

The network device provided in the embodiment corresponds to the service control method provided in the embodiment of the present invention, and is a device for executing the service control method. Reference may be made to the method embodiments shown in FIG. 2 and FIG. 3 for a specific process that the network device executes the service control method, and details are not described herein again.

According to the network device provided in the embodiment, a terminal can report its service status information and/or speed information to the network device, and the network device can configure a network parameter of the terminal according to the information, and can configure the network parameter of the terminal such as a CDRX parameter of the terminal, a sounding parameter, a CQI parameter, and a frequency selective channel, thereby improving a network throughput and reducing terminal energy consumption.

It may be clearly understood by persons skilled in the art that, for the purpose of convenient and brief description, only division of the above functional modules is illustrated. In a practical application, the above functions can be allocated to different functional modules for implementation as required. That is, the internal structure of the apparatus is divided into different functional modules to implement all or a part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method of configuring a connected discontinuous reception (CDRX) cycle for a terminal, comprising:
    sending, by a network device, a report request to the terminal, wherein the report request instructs the terminal to report speed information, wherein the speed information indicates a speed of the terminal;
    receiving, by the network device, a report response sent by the terminal, wherein the report response indicates that the terminal has received the report request or whether a report operation instructed by the report request has been executed;
    receiving, by the network device, the speed information reported by the terminal;
    increasing, by the network device, a value of the CDRX cycle when the speed of the terminal is less than a threshold; and
    decreasing, by the network device, the value of the CDRX cycle when the speed of the terminal is greater than a threshold,
    wherein the CDRX cycle indicates an interval for waking up the terminal.

2. The method according to claim 1, the method further comprising sending, by the network device, a stop report request to the terminal, wherein the stop report request instructs the terminal to stop reporting the speed information.

3. A method of configuring a connected discontinuous reception (CDRX) cycle for a terminal, comprising:
sending, by a network device, a report request to the terminal, wherein the report request instructs the terminal to report status information of a service of the terminal and speed information of the terminal;
receiving, by the network device, a report response sent by the terminal, wherein the report response indicates that the terminal has received the report request or whether a report operation instructed by the report request has been executed;
receiving, by the network device, the status information and the speed information reported by the terminal; and
configuring, by the network device, the CDRX cycle for the terminal in accordance with the status information and the speed information,
wherein the CDRX cycle is configured to be a lesser of a first value determined according to the speed information and a second value determined according to the status information, and
wherein the CDRX cycle indicates an interval for waking up the terminal.

4. The method according to claim 3, the method further comprising sending, by the network device, a stop report request to the terminal, wherein the stop report request instructs the terminal to stop reporting the status information and the speed information.

5. The method according to claim 3, wherein the status information comprises at least one of a start information of at least one service of the terminal, a stop information of at least one service of the terminal, and a data volume information of at least one service of the terminal.

6. A network device for configuring a connected discontinuous reception (CDRX) cycle for a terminal, comprising:
a transceiver configured to:
send a report request to the terminal, wherein the report request instructs the terminal to report speed information, wherein the speed information indicates speed of the terminal;
receive a report response sent by the terminal, wherein the report response indicates that the terminal has received the report request or whether a report operation instructed by the report request has been executed; and
receive the speed information reported by the terminal; and a processor coupled to the transceiver and configured to:
increase a value of the CDRX cycle when the speed of the terminal is less than a threshold; and
decrease the value of the CDRX cycle when the speed of the terminal is greater than a threshold,
wherein the CDRX cycle indicates an interval for waking up the terminal.

7. The network device according to claim 6, wherein the transceiver is further configured to send a stop report request to the terminal, wherein the stop report request instructs the terminal to stop reporting the speed information.

8. A network device for configuring a connected discontinuous reception (CDRX) cycle for a terminal, comprising:
a transceiver configured to
send a report request to the terminal, wherein the report request instructs the terminal to report status information of a service of the terminal and speed information of the terminal;
receive a report response sent by the terminal, wherein the report response indicates that the terminal has received the report request or whether a report operation instructed by the report request has been executed; and
receive the status information and the speed information reported by the terminal; and
a processor coupled to the transceiver and configured to configure the CDRX cycle for the terminal in accordance with the status information and the speed information,
wherein the CDRX cycle is configured to be a lesser of a first value determined according to the speed information and a second value determined according to the status information, and
wherein the CDRX cycle indicates an interval for waking up the terminal.

9. The network device according to claim 8, the transceiver is further configured to send a stop report request to the terminal, wherein the stop report request instructs the terminal to stop reporting the status information and the speed information.

10. The network device according to claim 8, wherein the status information comprises at least one of a start information of at least one service of the terminal, a stop information of at least one service of the terminal, and a data volume information of at least one service of the terminal.

* * * * *